United States Patent [19]

Burton et al.

[11] 3,926,955

[45] Dec. 16, 1975

[54] CARBENICILLIN ANALOGUES

[75] Inventors: George Burton, Coulsdon; John Sydney Davies, Reigate; Ann Frances Hubbard, Redhill, all of England

[73] Assignee: Beecham Group Limited, England

[22] Filed: Sept. 25, 1972

[21] Appl. No.: 291,798

[30] Foreign Application Priority Data

Oct. 8, 1971  United Kingdom............... 46929/71

[52] U.S. Cl.............................. 260/239.1; 424/271
[51] Int. Cl.$^2$...................................... C07D 499/46
[58] Field of Search................................. 260/239.1

[56] References Cited
UNITED STATES PATENTS 3,142,673  7/1964  Hobbs............................ 260/239.1
3,282,926  11/1966  Brain et al...................... 260/239.1

Primary Examiner—Paul M. Coughlan, Jr.
Assistant Examiner—David E. Wheeler

[57] ABSTRACT

Carbenicillin analogues, non-toxic salts and hydrolyzable mono- and di-esters useful in treating infectious diseases caused by Gram-positive and Gram-negative bacteria. The terminal side chain group R is a fully saturated heterocyclic or cycloalkyl radical. The heterocyclic radical has 5, 6 or 7 ring atoms and one or more heteroatoms including oxygen, sulphur, >$SO_2$ or >NR' wherein R' is hydrogen, lower alkyl, aryl, aralkyl or aryloxycarbonyl. Cycloalkyl is exemplified by cyclopropyl, cyclopentyl, cyclohexyl or cycloheptyl. Representative penicillins are α-carboxycyclopropyl methyl penicillin, α-carboxycyclohexyl methyl penicillin, α-carboxy-2-tetrahydropyranyl methyl penicillin and α-carboxytetrahydrothiophen-1,1-dioxide-3-yl methyl penicillin.

5 Claims, No Drawings

CARBENICILLIN ANALOGUES

This invention relates to certain new penicillins and is particularly concerned with a new class of penicillins which are derivatives of 6-aminopenicillanic acid and which are of value as antibacterial agents, as nutritional supplements in animal food, as agents for the treatment of mastitis in cattle and as therepeutic agents in poultry and animals, including man, in the treatment especially of infectious diseases caused by Gram-positive and Gram-negative bacteria.

According to the present invention there is provided a class of α-carboxy penicillins of formula (I):-

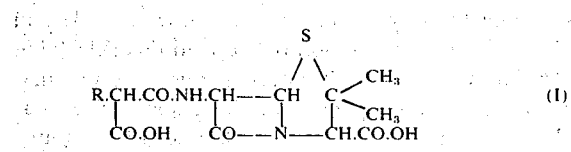

and non toxic salts and hydrolysable esters thereof, wherein R is a fully saturated heterocyclic radical or a cycloalkyl radical.

The salts of the penicillins of formula (I) are non-toxic salts including non-toxic metallic salts such as sodium, potassium calcium and aluminium, ammonium and substituted ammonium salts, e.g. salts of such non-toxic amines as trialkylamines (including triethylamine), procaine, dibenzylamine, N-benzyl-β-phenethylamine, 1-ephenamine, N,N$^1$-dibenzylethylenediamine, dehydroabietylamine, N,N$^1$-bis-dehydro-abietylethylenediamine, and other amines which have been used to form salts with benzylpenicillin.

The esters of the penicillins of formula (I) are non-toxic esters, particularly those which are easily de-esterified in the body to give the parent penicillanic acids. Examples of such esters include acyloxyalkyl esters, particularly the acyloxymethyl esters such as acetoxymethyl and pivaloyloxymethyl esters.

The group R in formula (I) may be either a fully saturated heterocyclic radical or a cycloalkyl radical. When R is heterocyclic preferred radicals are monocyclic heterocyclic radicals having from 5 to 7, especially 6 ring atoms. This definition includes heterocyclic radicals having more than one heteroatom in the ring, and, in this case, the hetero atoms may be the same of different. Examples of fully saturated heterocyclic radicals R include those of formulae (II) - (VI):

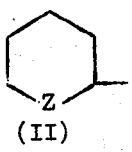 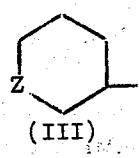 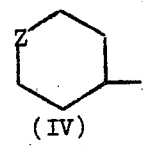

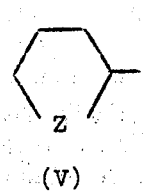 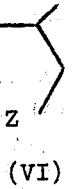

wherein Z is oxygen, sulphur, >SO$_2$ or >N—R$^1$ wherein R$^1$ is hydrogen, lower alkyl, aryl, aralkyl or aryloxycarbonyl.

When the group R of formula (I) is a cycloalkyl group, preferred groups are those having from 3 to 8 carbon atoms in the ring e.g. cyclopropyl, cyclopentyl, cyclohexyl or cycloheptyl.

The present invention further provides a process for the preparation of penicillins having the general formula (I) in which 6-aminopenicillanic acid or a salt or ester thereof or a silyl derivative of 6-aminopenicillanic acid is treated with reactive derivative of an acid of the general formula (VII):

wherein R is as defined in formula (I) and X is a hydroxy group or chlorine atom or the group — O R$^2$ where R$^2$ is an alkyl, aryl, benzyl or substituted benzyl group which is subsequently removed.

The reactive derivative of the acid (VII) may be the acid halide, azide, anhydride, mixed anhydride or the reactive intermediate formed from the acid and a carbodiimide or carbonyldiimidazole.

When the removal of the group R$^2$ to form the free penicillin is effected by catalytic hydrogenation, e.g. by allowing the protected derivative to react with hydrogen in the presence of a catalyst, the hydrogenation is normally carried out at room temperature and at atmospheric pressure, the pH of the reaction mixture being from 5 to 9. The solvent for the hydrogenation is normally water, but other non-reducible solvents such as ethyl alcohol or dioxane or mixtures of these with water may be employed.

The preferred hydrogenation catalyst is palladium but other catalysts such as nickel, platinum or rhodium may be used. The catalyst may be employed on an inert support e.g. of barium carbonate, calcium carbonate or carbon.

A complication which sometimes arises in the preparation of the new penicillins of the present invention is due to the well-known tendency of malonic acid derivatives to undergo decarboxylation under certain conditions, such as when heated. If such a side-reaction occurs at one of the intermediate stages it may result in the final penicillin being contaminated with the decarboxylated analogue of the formula:-

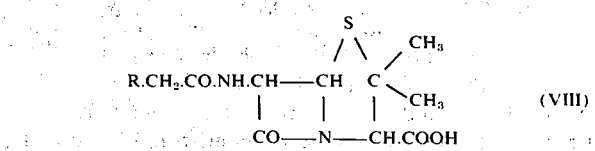

When such a second penicillin is present it can be readily detected by paper chromatography. The presence of the decarboxylated penicillin (VIII) as an impurity in (I) will not necessarily be a disadvantage, but if it is desired to remove the contaminating penicillin, this can be accomplished in various ways by taking advantage of the known properties of such penicillins.

Thus in some cases the separation may be effected by column chromatography or by recrystallisation. In other cases the decarboxylated penicillin (VIII) may be extracted into a suitable organic solvent at pH 2.5 to 4, conditions under which the main product (I) remains substantially in the aqueous phase. Yet another method is to incubate a solution of the mixed penicillins with an enzyme, such as the amidase produced by certain strains of *Escherichia coli*, which degrades the penicillin (VIII) to 6-aminopenicillanic acid while leaving the penicillin (I) essentially unattacked.

Since some of the antibiotic substances obtained by the process of this invention are relatively unstable compounds which readily undergo chemical changes resulting in the loss of antibiotic activity, it is desirable to choose reaction and isolation conditions which are sufficiently moderate to avoid their decomposition.

Esters of the penicillins of formula (I) may be prepared by direct esterification of the penicillin (I), in which case both carboxyl groups are esterified. Alternatively, if only the α-carboxyl group is to be esterified, 6-APA or a salt thereof or the reactive product of 6-APA with an organo-silicon compound may be reacted with a reactive derivative of the corresponding mono-ester of the side chain acid. If only the 3-carboxyl group is to be esterified, the appropriate 6-APA ester may be reacted with a compound of formula (VII).

The penicillins of this invention are capable of existing in at least two epimeric forms, since the carbon atom marked * is asymmetric:-

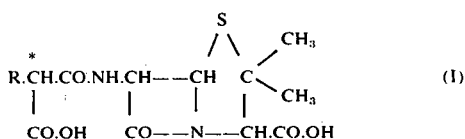

However, if a hetero atom in the group R disrupts the plane of symmetry of the ring, another asymmetric centre is introduced and a further pair of epimers is possible. It is to be understood that this invention includes the pure epimers and also mixtures of epimers of the compounds of formula (I).

The following Examples illustrate the present invention.

EXAMPLE 1

α-Carboxycyclopropylmethyl penicillin a. Benzyl hydrogen cyclopropylmalonate

To a solution of cyclopropylmalonic acid (2 g) in dry ether (20 ml) was added thionyl chloride (1.2ml) and dimethylformamide (2 drops). The mixture was heated under reflux for 2 hours and the solvent evaporated under reduced pressure. The residual sticky gum was treated with a solution of benzyl alcohol (1.5 g) in ether (20 ml), and the mixture heated under reflux for 2 hours. Subsequently the reaction mixture was cooled to room temperature, washed with water (20 ml), and the organic layer extracted with saturated sodium bicarbonate solution until the extracts were alkaline. The combined alkaline extracts were washed with ether (20 ml) and the aqueous layer acidified with 5N hydrochloric acid to pH 1. An oil was precipitated, and was exhaustively extracted with methylene dichloride (3 × 30 ml). The extracts were washed with water (4 × 30 ml), dried over anhydrous magnesium sulphate, and evaporated to dryness under reduced temperature and pressure to give a pale yellow oil (1 g). The oil was covered with petrol (b.p. 60°–80°) and placed in a vacuum desicator where it solidified to give while crystals 800 mg. (49%) m.p. 56°–60°. N.m.r. (CDCl$_3$) τ : −0.67 (s, 1H, acidic proton), 2.7 (s, 5H, aromatic protons), 4.77 (s, 2H, benzylic methylene protons), 7.26 (d, 1H, α-proton), 8.3–8.9 (m, 1H, cyclopropane methine proton), 9.1–9.8 (m, 4H, cyclopropane methylene protons) p.p.m.

b. α-(Benzyloxycarbonyl)-cyclopropylmethyl penicillin

Benzyl hydrogen cyclopropylmalonate (2.34 g) was heated at 70° for 1 hour with thionyl chloride (5 ml), and the excess thionyl chloride removed by vacuum distillation. 6-aminopenicillanic acid (2.16 g) in water (50 ml) was treated with N sodium hydroxide (10 ml), N sodium bicarbonate (15 ml), acetone (25 ml) and cooled to 12°C. A solution of the acid chloride (vide supra) in dry acetone (50 ml) was added and the mixture stirred at room temperature for 2 hours. The clear solution obtained was washed with ether (3 × 50 ml). The aqueous solution was covered with ether (50 ml), acidified with N hydrochloric acid (with stirring) to pH 1.5–2.0, and extracted with ether (2 × 50 ml). The combined ether extracts were washed with water (50 ml), and the penicillin extracted with N sodium bicarbonate solution until the aqueous extracts has a pH of 6.5–7. Evaporation of the aqueous solution at room temperature gave the penicillin as a white non-crystalline sodium salt 3.5 g(77%). N.m.r. (D$_2$O) τ : 2.7 (s, 5H, aromatic protons), 4.2–4.7 (m, 2H, β-lactam protons), 4.85 (s, 2H, benzylic methylene protons), 5.72 (br.s., 1H, C$_3$ proton), 7.18 (d, 1H, α-proton), 8–8.9 (m, 7H, gemdimethyl + cyclopropyl methyl), 9.2–9.8 (m, 4H, cyclopropyl ring methylene protons) p.p.m.

c. α-Carboxycyclopropylmethyl penicillin

5% palladium on calcium carbonate (3g) in water (10 ml) was prehydrogenated, α-(benzyloxycarbonyl) cyclopropylmethyl penicillin (1.5 g) in water (5 ml) was added, and the mixture shaken with hydrogen until the uptake of hydrogen ceased. Filtration of the solution through celite, and evaporation under reduced temperature and pressure gave α-carboxycyclopropylmethyl penicillin as white non crystalline calcium salt 1 g. (80%). N.m.r. (D$_2$O) τ :4.2–4.6 (m, 2H, β-lactam protons), 5.73 (s, 1H, C$_3$ proton), 7.49 (d, 1H, α-proton), 8–9 (m, 7H, cyclopropyl methine + gemdimethyl protons), 9–9.8 (m, 4H, cyclopropyl ring methylene protons) p.p.m.

EXAMPLE 2

α-Carboxycyclopentylmethyl penicillin a. Benzyl hydrogen cyclopentylmalonate

Cyclopentylmalonic acid (6.88 g) in ether (30 ml) was treated with 1 equivalent of thionyl chloride and then benzyl alcohol (4.32 g) as described in Example 1(a), to give the half ester as a light brown gum 3.5 g. (30%). N.m.r. (CDCl$_3$) τ : 1.05 (s, 1H, acid proton), 2.72 (s, 5H, aromatics), 4.85 (s, 2H, methylene protons), 6.7 (d, 1H, α-proton), 7.2–9 (m, 9H, cyclopentyl ring protons) p.p.m.

b. α-(Benzyloxycarbonyl)-cyclopentylmethyl penicillin

Benzyl hydrogen cyclopentylmalonate (3.5 g) was converted into the acid chloride by the action of thionyl chloride (7 ml) at 70°C for 1 hour. Acylation of 6-aminopenicillanic acid in aqueous acetonebicarbonate and subsequent sodium bicarbonate extraction as described in Example 1 (b) gave α-(benzyloxycarbonyl)-cyclopentylmethyl penicillin as a white non crystalline sodium salt 4.8 (74%).

c. α-Carboxycyclopentylmethyl penicillin

Hydrogenolysis of an aqueous solution of α-benzyloxycarbonyl cyclopentylmethyl penicillin (2 g) in the presence of a 5% palladium on calcium carbonate catalyst (6 g) as described in Example 1(c), gave the calcium salt of a α-carboxycyclopentylmethyl penicillin 1.5 g(90%).

EXAMPLE 3

α-Carboxycyclohexylmethyl penicillin a. Benzyl hydrogen cyclohexylmalonate

Cyclohexylmalonic acid (7.44 g) was treated with benzyl alcohol (4.32 g) as described in Example 1a to give benzyl hydrogen cyclohexylmalonate as a light brown gum. Trituration of the gum with petrol (b.p. 60°–80°) afforded a white solid 4 g. (35%) m.p. 58°–64°. N.m.r. ($CDCl_3$) τ : 2.7 (s, 5H, aromatic protons), 4.8 (s, 2H, benzylic methylene protons), 6.72 (d, 1H, α-proton), 7.6–9.2 (m, 11H, cyclohexyl ring protons) p.p.m.

b. α-(Benzyloxycarbonyl) cyclohexylmethyl penicillin

Acylation of 6-aminopenicillanic acid by the method described in Example 1(b) afforded α-(benzyloxycarbonyl) cyclohexylmethyl penicillin as a white non crystalline sodium salt in 57% weight yield. N.m.r. $[(CD_3)_2C=\tau$ : 2.64 (s, 5H, aromatic protons), 4,4 (s. 2H, β-lactam protons), 4.82 (s, 2H, benzylic methylene protons), 5.77 (s, 1H, $C_3$ proton), 6.65 (d, 1H, α-proton), 8–9.2 (m, 17H, cyclohexyl ring protons + gemdimethyl protons)p.p.m.

c. α-Carboxycyclohexylmethyl penicillin

Hydrogenolysis of α-(benzyloxycarbonyl) cyclohexylmethyl penicillin (1.5 g) over 5% $Pd/CaCO_3$ (4g) as described in Example 1 (c), gave α-carboxycyclohexylmethyl penicillin as the white non crystalline calcium salt 1 g. (82%).

EXAMPLE 4

α-Carboxycycloheptylmethyl penicillin a. Benzyl hydrogen cycloheptylmalonate

Cycloheptylmalonic acid (10 g) was converted into benzyl hydrogen cycloheptylmalonate by the method described in Example 1(a). The ester was obtained as a waxy solid 6.6 g (46%) m.p. 64°–69° after drying in a vacuum desicator over phosphorus pentoxide for several days. N.m.r. ($CDCl_3$)τ: −0.3 (s, IH, acidic proton), 2.68 (s, 5H, aromatic protons), 4.81 (s, 2H, methylene protons), 6.6 (d, 1H, α-proton), 8–9 (m, 12H, cycloheptyl ring protons) p.p.m.

b. α-(Benzyloxycarbonyl) cycloheptylmethyl penicillin

Acylation of 6-aminopenicillanic acid by the method described in Example 1 (b) afforded α-(benzyloxycarbonyl) cycloheptylmethyl penicillin as a white non crystalline sodium salt in 69% weight yield. N.m.r. $[(CD_3)_2S=O]\tau$: 2.7 (s, 5H, aromatic protons), 4.4–4.8 (m, 2H, β-lactam protons), 4.9 (s, 2H, benzylic methylene protons),6.05 (s, 1H, $C_3$ proton), 6.44 (d, 1H, α-proton), 7.6–9.1 (m, 19H, cycloheptyl ring protons + gemdimethyls) p.p.m.

c. α-Carboxycycloheptylmethyl penicillin

Hydrogenolysis of α-(benzyloxycarbonyl) cycloheptylmethyl penicillin (2 g) over 5%$Pd/CaCO_3$ (6 g) as described in Example 1 (a), afforded α-carboxycycloheptylmethyl penicillin as the white non crystalline calcium salt 1.59 (94%).

EXAMPLE 5

α-Carboxy-2-tetrahydropyranylmethyl penicillin a. Benzyl hydrogen 2-tetrahydropyranylmalonate An ethereal solution of phenyldiazomethane was prepared from N-nitroso-N-benzyltoluene-4-sulphonamide (7.25 g), sodium methoxide (1.35 g), methanol (5 ml), and ether (30 ml). The red solution was added dropwise with stirring to 2-tetrahydropyranylmalonic acid (4.6 g) in ether (25 ml) and the mixture stirred overnight. The ether solution was extracted with saturated sodium bicarbonate until the extracts were alkaline and the combined extracts washed with ether (15 ml). Acidification to pH 1 with 5N hydrochloric acid precipitated an oil which was extracted with methylene dichloride (3 × 55 ml.) The combined methylene chloride extracts were washed with water (4 ×100ml), dried over anhydrous magnesium sulphate, and evaporated to give a light brown oil in 40% weight yield. N.m.r. ($CDCl_3$) τ 0.5 (s, 1H, acidic proton), 2.7 (s, 5H, aromatic protons), 4.8 (s, 2H, methylene protons), 5.8–6.8 (m, α-proton + $C_2$ methine + $C_6$ methylene protons), 8–9 (m, 6H, ring methylene protons) p.p.m.

b. Benzyl α-(Benzyloxycarbonyl)-2-tetrahydropyranylmethyl penicillanate

Dicyclohexylcarbodiimide (1.34 g) was added to a solution of benzyl hydrogen 2-tetrahydropyranylmalonate (2.6 g), benzyl 6-aminoenicillanate (3.12 g) and triethylamine (0.66 g), in purified methylene dichloride (33 ml). (Passed down a column of basic alumina). Heat was evolved and the reaction mixture was cooled in a water bath while it was stirred for 5 hours. A precipitate of dicyclohexylurea formed soon after the reaction started and at the end of the reaction acetic acid (0.5 ml) was added and the mixture stirred for a further 30 minutes. The precipitate was filtered and the filtrate washed successively with water, dil. sulphuric acid, water, 50% saturated sodium bicarbonate, water, and finally dried over anhydrous magnesium sulphate. The solvent was removed in vacuo and the compound dried in a vacuum desicator. A cream foam 3 g., (55%) was obtained. N.m.r. $[(CD_3)_2SO]\tau$: 2.5–2.8 (2s, 10H, aromatic protons), 4.3–4.7 (m, 2H, β-lactam protons), 4.8–5 (4H, benzine methylene protons), 5.59 (s, 1H, $C_3$ proton), 5.8–7 (m 4H, α-proton + protons adjacent to oxygen), 8–9 (m, 13H, tetrahydropyranyl ring protons + gemdimethyls) p.p.m.

c. α-Carboxy-2-tetrahydropyranylmethyl penicillin

Benzyl α-(Benzyloxycarbonyl)-2-tetrahydropyranylmethyl penicillanate (1.5 g) in ethanol (10 ml) was added to a prehydrogenated mixture of 5%Pd/CaCO$_3$ (1.5 g) in ethanol (10 ml), and the mixture shaken under hydrogen until no more hydrogen was absorbed. Filtration of the mixture through celite and evaporation of the ethanol under reduced temperature and pressure afforded a pale brown gum. The gum was dissolved in ether (30 ml) and extracted with N sodium bicarbonate solution until the pH of the extracts was 6.5. Evaporation of the bicarbonate extracts gave a foam, which was dried in a vacuum desicator over phosphorus pentoxide. The penicillin was obtained as a white non crystalline sodium salt 900 mg (89%).

EXAMPLE 6 a. Benzyl hydrogen tetrahydrothiophen-1,1-dioxide-3-ylmalonate

Tetrahydrothiophen-1,1-dioxide-3-ylmalonic acid (prepared according to H.E. Faith *J.Org.Chem.*, 1962, 27, 2889) (6.66 g., 0.03M) was dissolved in tetrahydrofuran (50 ml) and stirred while an ethereal solution of phenyldiazomethane (prepared from N-nitroso-N-benzyltoluene 4-sulphonamide (8.6 g. 0.03 ml) as described by C.G. Overberger (*J.Org.Chem.*, 1963, 28, 5921) was added dropwise. The resulting solution was stirred for 3 hours, the solvent was then removed in vacuo and the residue dissolved in ethyl acetate. The solution was extracted with saturated sodium bicarbonate solution, the extracts were washed with ethyl acetate, acidified to pH 0.5 with 5N hydrochloric acid and extracted with ethyl acetate. The extracts were dried (anhydrous magnesium sulphate) and the solvent removed in vacuo to yield a yellow oil (3.46 g). This was purified by column chromatography on silica gel M.F.C. eluting with benzene/ethyl acetate (4:1) to give a waxy solid 1.5 g (12%) m.p. 106°–111°, n.m.r. (CD$_3$)$_2$CO; γ : 2.60 (s, 5H, aromatic protons); 3.48 (s, 2H, benzyl methylene), 5.48 (s, 1H, α-proton), 6.2–8.4 (m, 7H, tetrahydrothiophene 1, 1-dioxide ring protons).

b. α-(Benzyloxycarbonyl)-tetrahydrothiophen-1,1-dioxide-3-ylmethyl penicillin Benzyl hydrogen tetrahydrothiophen-1,1-dioxide-3-ylmalonate (1.63 g., 0.005M) was stirred at 70° for 1 hour with thionyl chloride (2.5 ml). Excess thionyl chloride was removed in vacuo and the residue was dissolved in anhydrous acetone. This solution was added to a stirred solution of 6-aminopenicillanic acid (1.08 g., 0.005M) in water (25 ml), acetone (12.5 ml), N sodium bicarbonate solution (7.5 ml) and N sodium hydroxide (5 ml) cooled to 12°. The resulting solution was stirred at R.T. for two hours, washed three times with ether, covered with ether and acidified to pH 1.5 with 1N hydrochloric acid. The organic layer was separated and the aqueous layer extracted twice with ether. The organic extracts were combined, washed with water and extracted with N sodium bicarbonate solution until the total extract was at pH 7. The water was removed under reduced temperature and pressure and the residue in vacuo over phosphorus pentoxide to give the sodium salt of α-(benzyloxycarbonyl)-tetrahydrothiophen-1,1-dioxide-3-ylmethyl penicillin 2.04 g. (76.4%).

c. α-Carboxytetrahydrothiophen-1,1-dioxide-3-ylmethyl penicillin

α-(Benzyloxycarbonyl) tetrahydrothiophen-1,1-dioxide-3-ylmethyl penicillin sodium salt (1 g) in water (10 ml) was added to a prehydrogenated mixture of 5% palladium on calcium carbonate (3 g) in water (50 ml) and hydrogenation continued until the uptake of hydrogen ceased. The suspension was filtered through celite and the filtrate evaporated in vacuo to yield the calcium salt of α-carboxytetrahydrothiophen-1,1-dioxide-3-ylmethyl penicillin 0.8 g, (93%).

EXAMPLE 7

α-Carboxytetrahydrothiophen-3-ylmethyl penicillin

Tetrahydrothiophen -3-yl-malonic acid (0.95 g., 0.005 mol.) dissolved in dry ether (3 ml) was treated with thionyl chloride (0.4 ml) and refluxed for 2 hours. The solvent was removed under reduced pressure and the residue dissolved in dry acetone (25 ml). 6-Aminopenicillanic acid (1.08 g., 0.005 mol.) was dissolved in water (25 ml), N sodium hydroxide (5 ml), N sodium bicarbonate (7.5 ml) and acetone (22.5 ml). The reaction mixture was cooled to 0° and the acid chloride solution added dropwise. Simultaneously, N sodium bicarbonate solution was added to maintain pH 6. The clear solution was washed with ether (3 × 25 ml) and extracted with ether (25 ml) after acidification to pH 1.5–2.0 with N hydrochloric acid. The aqueous phase was re-extracted with ether (2 × 25 ml) and the combined organic extracts washed with water (10 ml). The ether solution was extracted with N sodium bicarbonate solution (10 ml) and evaporation in vacuo gave the penicillin as a yellow non-crystalline solid 1.6 g (78%).

EXAMPLE 8

α-Carboxy-4-tetrahydrothiapyranyl methyl penicillin a. 4-Tetrahydrothiapyranyl benzenesulphonate

A solution of 4-tetrahydrothiapyranol (13.7 g) in dry pyridine (38.4 g), was stirred and maintained at −10° to 0° while a solution of benzenesulphonyl chloride (21.2 g) was added slowly. The reaction mixture was kept at 2°–3° for 24 hours, then poured into a vigorously agitated mixture of ice (150 g) and 5N hydrochloric acid (65 ml). The product solidified, and it was collected, triturated with cold 1N hydrochloric acid, filtered off, washed with water and dried over phosphorus pentoxide in vacuo, to yield white crystals (28 g., 93%). After crystallisation from ethanol it has m.p. 65°–66°.

b. Diethyl-4-tetrahydrothiapyranyl malonate

The above benzenesulphonate ester (7.22 g) in absolute alcohol (15 ml) was stirred under reflux overnight with a solution of sodiodiethyl malonate (prepared from sodium (1.6 g), diethyl malonate (26.5 g) and alcohol (20 ml)). The alcohol was removed under reduced pressure and water added to the residue. Acidification of the solution with 5N hydrochloric acid precipitated an oil which was taken up in ether, dried over anhydrous magnesium sulphate and the ether removed. Distillation of the residue afforded diethyl-4-tetrahydrothiapyranyl malonate (6 g., 83%); b.p. 120°–124°/1.5 mm.

c. Tetrahydrothiapyranyl-4-malonic acid

A solution of diethyl-4-tetrahydrothiapyranyl malonate (6 g.) and sodium hydroxide (5 g) in 33% ethanol (37.5 ml) was boiled for 1 1/2 hours. The solution was cooled, the ethanol evaporated, and the aqueous solution extracted with ether to remove any starting malonate. Acidification of the aqueous phase and continuous ether extraction overnight afforded tetrahydrothiapyranyl-4-malonic acid (3.53 g., 75%), m.p. 142°–144° (d).

d. α-Carboxy-4-tetrahydrothiapyranyl methyl penicillin

Tetrahydrothiapyranyl-4-malonic acid (1.02 g) was stirred with oxalylchloride (5 ml) for 2 hours at room temperature. Excess oxalyl chloride was removed in vacuo and the residue was dissolved in anhydrous acetone. This solution was added to a stirred solution of 6-aminopenicillanic acid (1.08 g) in water (25 ml), acetone (12.5 ml), N sodium bicarbonate (7.5 ml) and N sodium hydroxide (5 ml) cooled to 10°C. The sodium solution was stirred at R.T. for 2 hours, washed 3 times with ether, covered with ether and acidified to pH 1.5 with 1 N hydrochloric acid. The organic layer was separated and the aqueous layer extracted twice with ether. The organic extracts were combined, washed with water and extracted with N sodium bicarbonate until the total extract was at pH 7. Freeze drying gave the white disodium salt of α-carboxy-4-tetrahydrothiapyranyl methyl penicillin (800 mg., 40%). N.m.r. [D$_2$O]τ: 4.3–4.6 (m, 2H, β-lactam protons), 5.73 (S, 1H, C$_3$ proton), 7.03 (Cl, 1H, α-proton), 7.1–7.5 (m, 4H, ring methylene protons), 7.8–9 (m, 11H, ring methylene + ring methine + gemdimethyl protons) p.p.m.

We claim:

1. A penicillin of formula (I):-

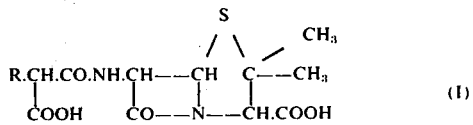

or a non-toxic salt or non toxic ester which is hydrolyzable in vivo to the free acid, thereof, in which formula R is cyclopropyl.

2. The individual epimers of the penicillin, penicillin salts or penicillin esters of claim 1 and mixtures thereof.

3. A penicillin ester as claimed in claim 1 wherein either or both carboxyl groups are esterified.

4. A penicillin ester as claimed in claim 3 wherein the ester is an alkanoyloxy ester.

5. The compound of claim 1 which is α-carboxycyclopropylmethyl penicillin.

* * * * *